Oct. 2, 1951 — H. C. FORD — 2,569,560
GUN SIGHT
Filed Feb. 6, 1945 — 5 Sheets-Sheet 1

INVENTOR.
Hannibal C. Ford
HIS ATTORNEY.

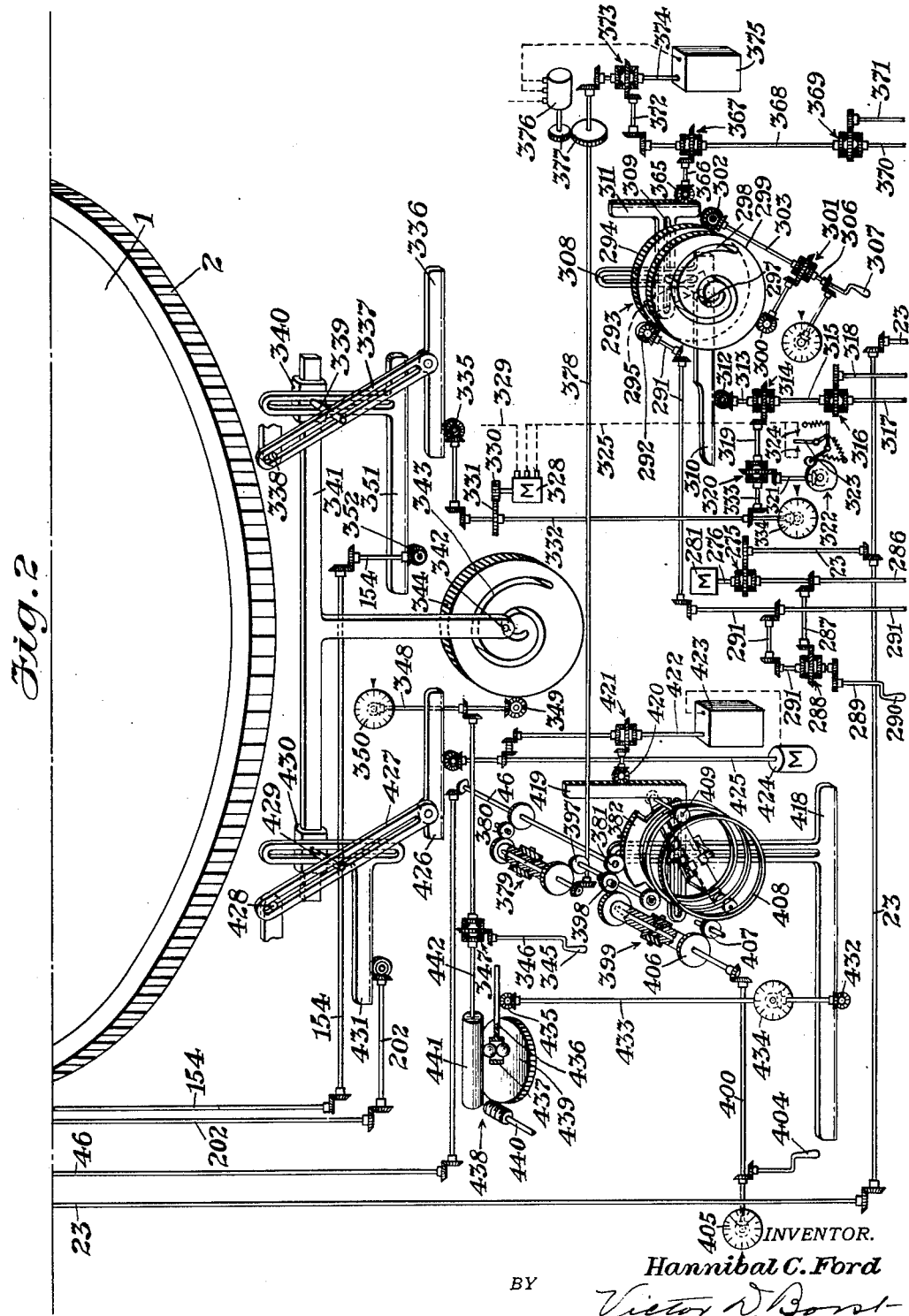

Oct. 2, 1951          H. C. FORD          2,569,560
GUN SIGHT
Filed Feb. 6, 1945          5 Sheets-Sheet 3
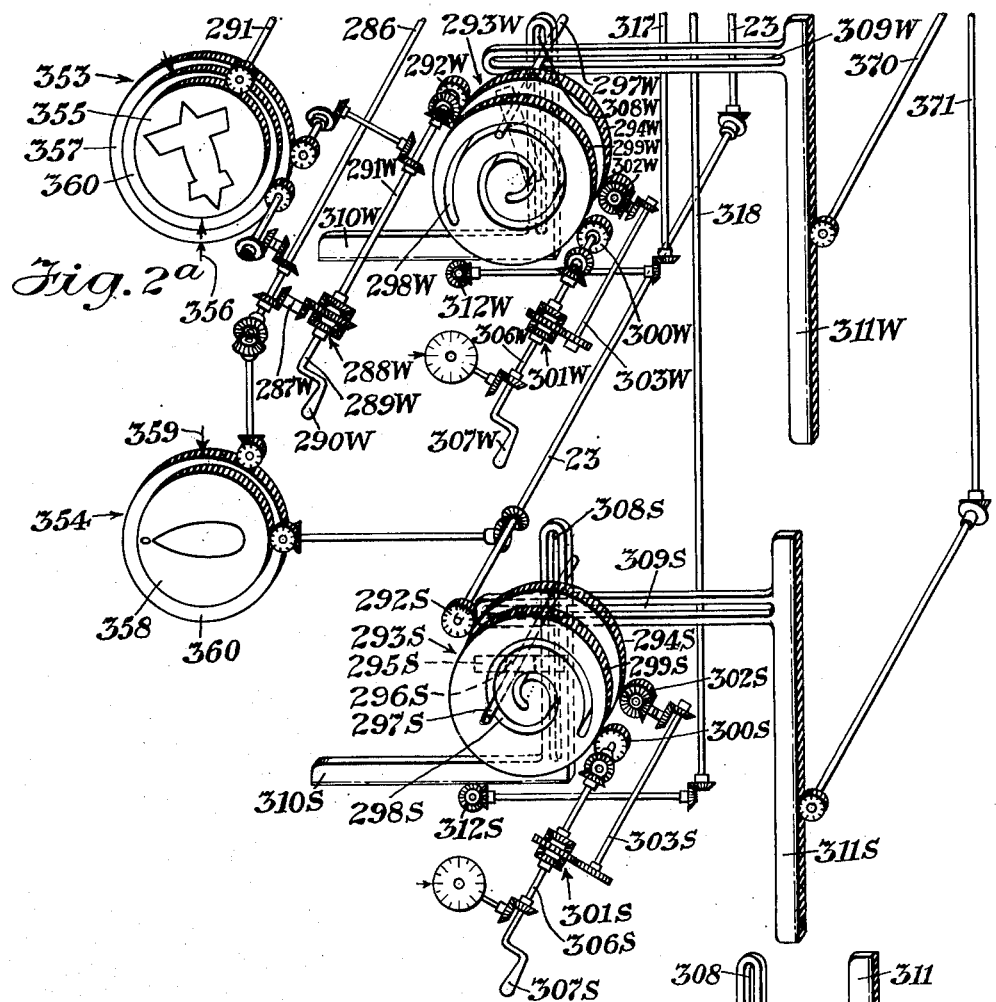
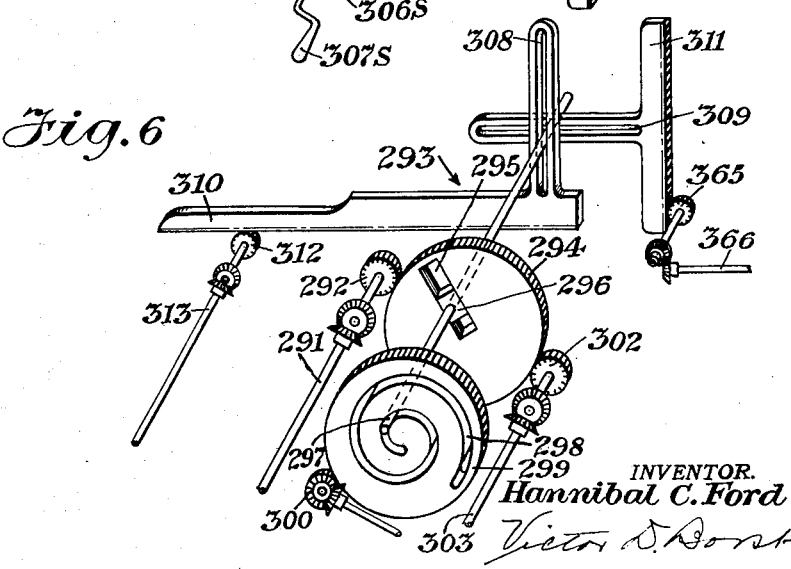
INVENTOR.
Hannibal C. Ford
HIS ATTORNEY.

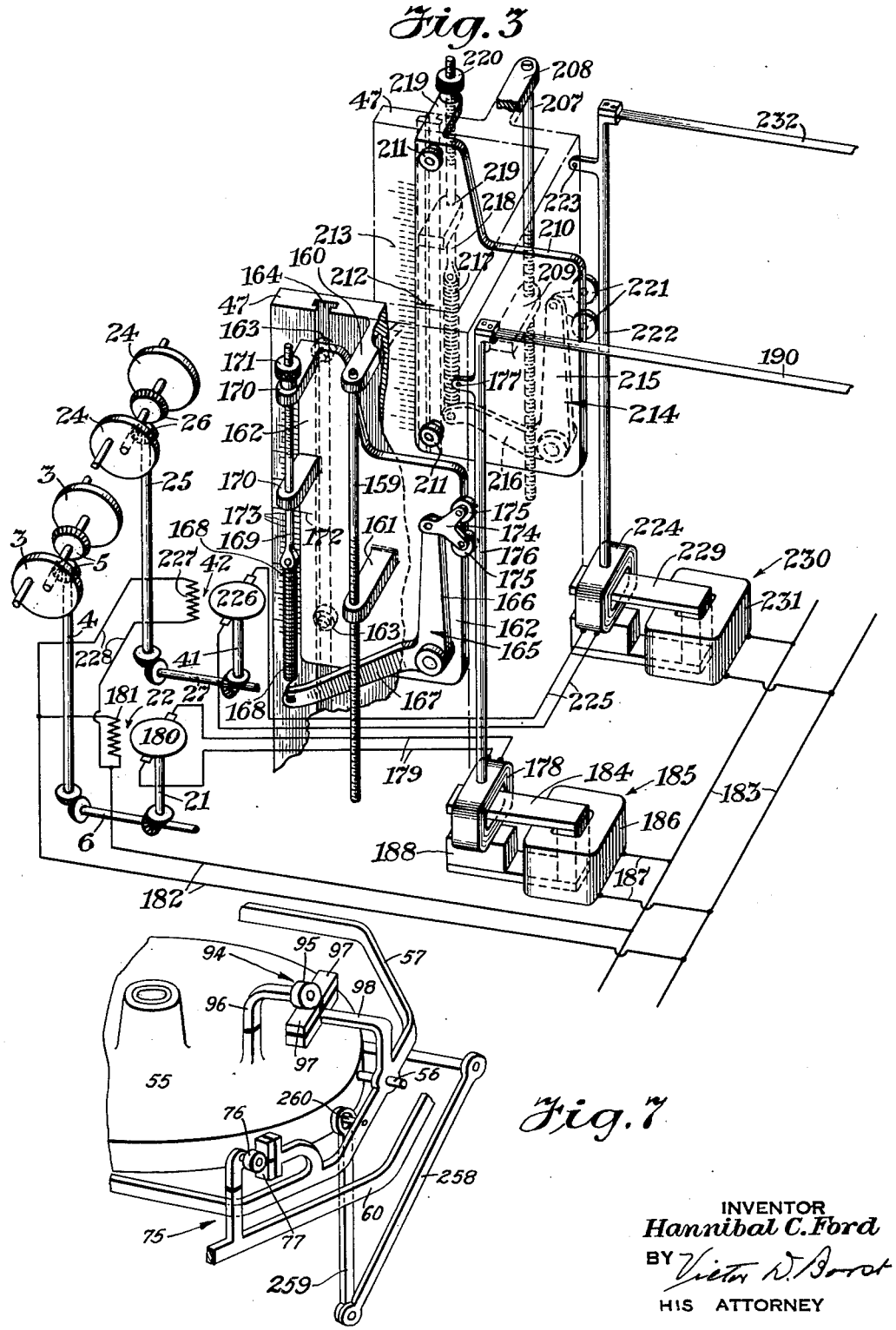

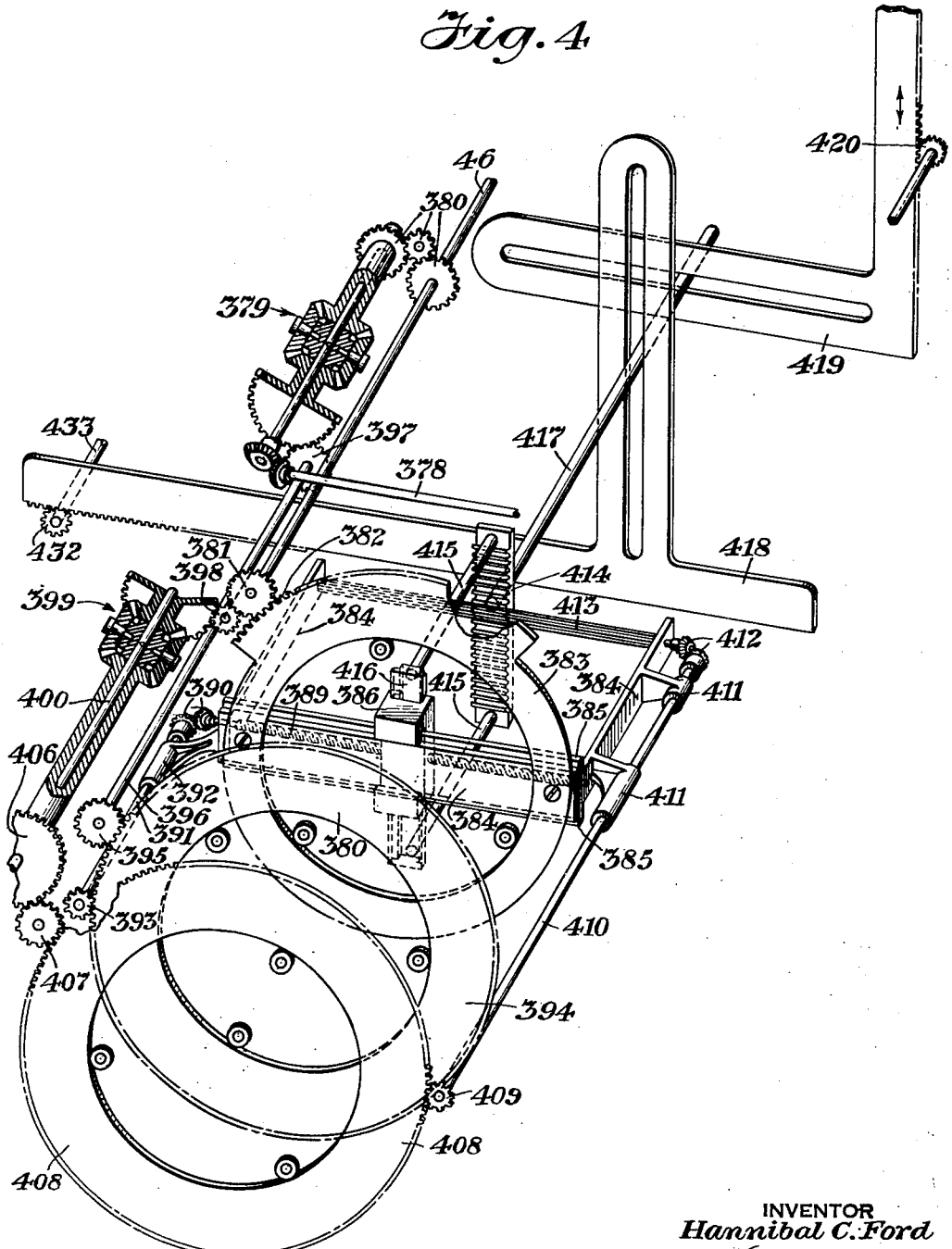

Patented Oct. 2, 1951

2,569,560

UNITED STATES PATENT OFFICE 2,569,560

GUN SIGHT

Hannibal C. Ford, Great Neck, N. Y., assignor to The Sperry Corporation, a corporation of Delaware Application February 6, 1945, Serial No. 576,451

22 Claims. (Cl. 33—49)

This invention relates to fire control instruments and more particularly to mechanism adapted to be maintained in a predetermined relation to a line to a target to serve as a directing and reference element for use with other mechanism for predicting future positions of the target in order that the guns may be properly aimed for their projectiles to hit the target.

In a copending application filed July 26, 1928, Serial No. 295,437, there is disclosed apparatus of this character which when properly adjusted will automatically maintain a mechanism in a predetermined relation to a line to a target so that the operators of the apparatus are relieved of the duty of following the target in train and elevation except in so far as they may be required to make adjustments from time to time to correct for changes in the movement of the target.

While in that application means are provided for compensating for changes in the course of the craft on which the apparatus is mounted, no means are provided for compensating for angular motions, such as roll and pitch, which would cause continual deviations of the mechanism from its predetermined relation to the line to the target.

In another copending application filed July 21, 1928, Serial No. 294,496, now Patent No. 2,437,463, granted March 9, 1948, there is disclosed an instrument which when properly adjusted will maintain a mechanism, such as a sighting device, in a predetermined relation to a line to a target irrespective of the roll and pitch of the craft on which it is mounted. In other words, the instrument provides a stable plane of reference to serve as a datum from which the movements in elevation of the target may be determined for use in mechanism for predicting future positions of the target. For the purpose of this copending application, roll, designated L, is the angle of inclination of the deck of the craft in the plane of fire to a true horizontal plane. Cross-roll, designated Z, is the angle of inclination of the deck of the craft to the true horizontal plane and in a plane at 90° to the plane of fire.

More specifically the horizontal stable plane of reference is maintained by a gyroscope, designated herein as a level gyroscope. A second gyroscope, designated herein as an angle gyroscope, is provided for maintaining the mechanism in a predetermined relation to a line to the target. This gyroscope is caused to precess in train and elevation at the required rates for this purpose by torques which are applied to it in accordance with the rate of change of movement of the line to the target due to relative movement between the instrument and the target.

This application is a continuation-in-part of the said application, Serial No. 294,496, now Patent No. 2,437,463, and is a continuation in part of the said application Serial No. 295,437, and as such it discloses characteristic features of those applications but it is directed more particularly to the correlation of operative elements between the gyroscopic unit and the torque applying mechanism forming the subject matter of application Serial No. 294,496, and the computing mechanism forming the subject of application Serial No. 295,437, so that the torque applying mechanism of the gyroscopic unit will be adjusted by the computing mechanism and the computing mechanism will in turn be controlled in part by the angular position of the gyroscopic unit, as will more clearly appear from a description of a preferred embodiment as shown in the accompanying drawings in which:

Fig. 2 is a similar view of part of the computing mechanism of the instrument;

Fig. 2a is a continuation of Fig. 2 showing the balance of the computing mechanism.

Fig. 3 is a view on an enlarged scale of the torque applying mechanism of Fig. 1;

Fig. 4 is a similar view of certain elements of Fig. 2;

Fig. 6 is an expanded view of a portion of Fig. 2 and,

Fig. 7 is an enlarged view of a portion of Fig. 1.

Figures 1, 5:
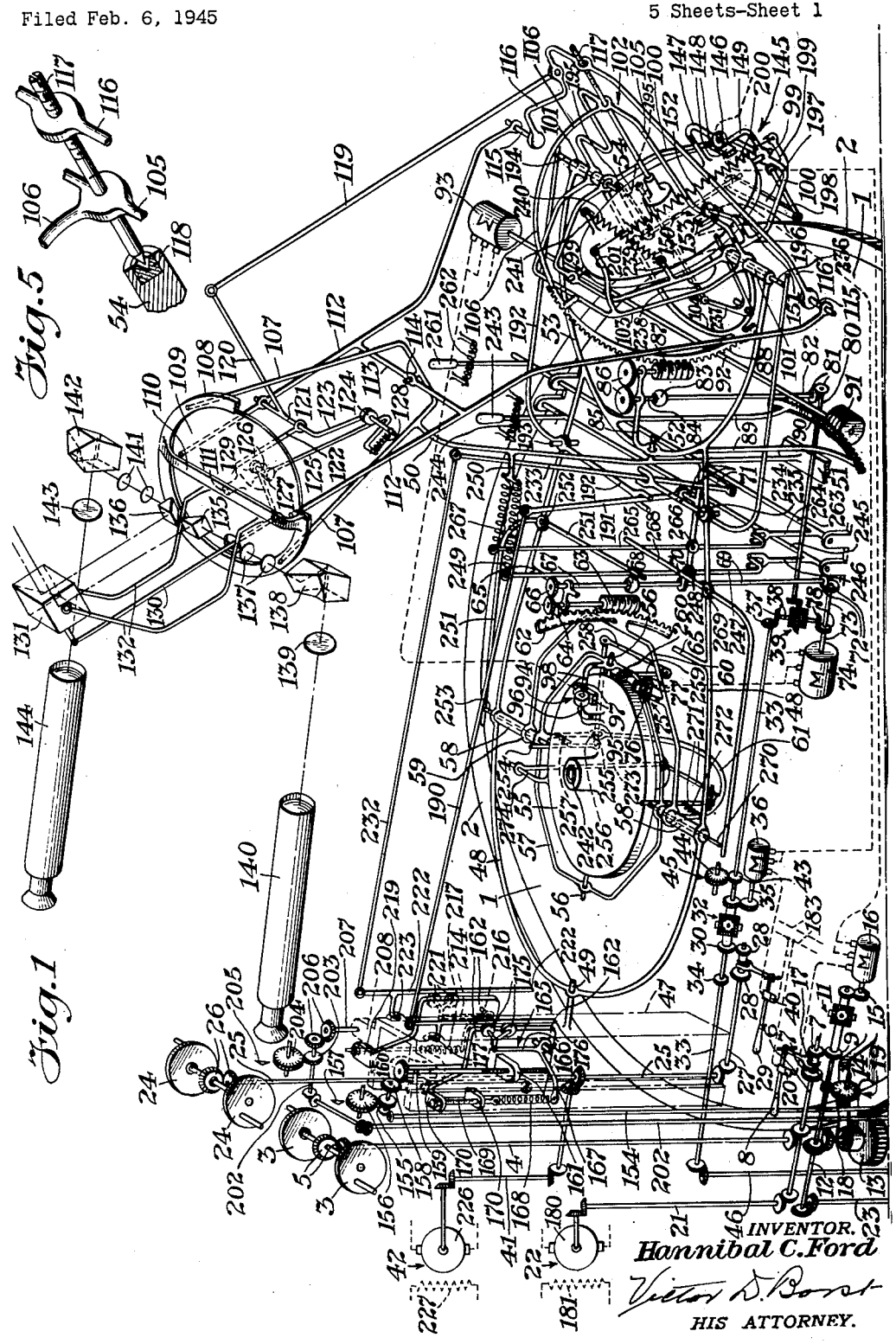
Fig. 1 is a diagrammatic perspective view of the gyroscopic and sighting device unit of the instrument.
Fig. 5 is an enlarged view of a portion of Fig. 1.

Referring to Fig. 1, I represents the base of the instrument which is rotatively mounted upon a fixed pedestal carrying an annular rack 2 surrounding the base. For training the instrument there is provided a pair of hand-wheels 3 suitably mounted upon the base and connected to drive a shaft 4 through a pair of bevel gears 5. The shaft 4 drives a shaft 6 having splined thereon a pair of unified gears 7 adapted to be shifted by a lever 8. When in the position shown one of the gears 7 engages a pinion 9 connected to one member of a differential 11. A second member of the differential is attached to a shaft 12 which drives a pinion 13 mounted in a bracket 14 attached to the base 1. The pinion 13 meshes with the rack 2. The third member of the differential 11 is geared to the shaft 15 of a motor 16 controlled by the angle gyroscope of the instrument as will hereinafter be described in detail. The shaft 12 is provided with a pinion 17 adapted to be engaged by the other gear of the pair of gears 7 when the shifting lever 8 occupies its alternative position. The pinion 17 also drives a dial 18 readable against an index 19 for showing the relative target bearing, designated B$_T$. The shifting lever 8 is provided with a switch 20 in the circuit of the motor 16 and having a fixed contact element and a movable contact element attached to the lever. A shaft 21 leads from shaft 6 to an electrical generator 22, the function of which will be hereinafter explained in more detail.

A branch shaft 23 leads from shaft 12 to the portion of the instrument shown in Fig. 2.

For adjusting the position of the instruments in elevation the pointer is furnished with a pair of hand-wheels 24 suitably mounted on the base 1 and connected to drive a shaft 25 through a pair of bevel gears 26. The shaft 25 drives a shaft 27 having splined thereon a pair of unified gears 28 adapted to be shifted by a lever 29. When in the position shown one of these gears engages a pinion 30 connected to one member of a differential 32, a second member of which is attached to a shaft 33 provided with a pinion 34 adapted to be engaged by the other gear of the pair 28 when the lever 29 is shifted to its alternative position. The third member of the differential 32 is geared to the shaft 35 of a motor 36 controlled by the angle gyroscope as will hereinafter appear.

The shaft 33 extends in the other direction from the differential 32 to a pair of bevel gears 37 from which a shaft 38 leads to one member of a differential 39, the other members of which will hereinafter be described. The shifting lever 29 is provided with a switch 40 in the circuit of motor 36. As in the case of the training elements a branch shaft 41 leads from shaft 25 to a generator 42 the purpose of which will hereinafter appear. The shaft 33 carries a pinion 43 for driving a dial 44 reading against an index 45 to show the value of the elevation A of the line of sight. A branch shaft 46 leads from shaft 33 to the portion of the instrument shown in Fig. 2.

Rising from the base 1 near its periphery is a standard 47 serving as a support for one end of a main frame 48 through a bearing 49. Another standard 50 rises from a member 51 which will be understood as being likewise attached to the base of the instrument. The standard 50 serves as a second support through a bearing 52 for the main frame 48 which at this point is formed with an arcuate portion 53 between the ends of which is carried the angle gyroscope 54 as will hereinafter appear.

For the purpose of stabilizing certain elements of the instrument there is provided a level gyroscope 55 consisting of a rotor within a casing, the latter having trunnions 56 mounted in a gimbal ring 57 which in turn is mounted upon tubular trunnions 58 integral with opposite sides of the main frame 48 and lying at right angles to the trunnions 56. A double bail frame 59 is mounted at its ends upon the trunnions 58 and consists of a horizontal portion 60 and a vertical depending portion 61. The portion 60 carries a vertically disposed gear sector 62 meshing with a worm 63 on a shaft 64 mounted in a transverse member 65 of the main frame 48. The shaft 64 is connected by pinion 66 to a shaft 67 also mounted in the member 65 and connected at its lower end through a universal joint 68 to a shaft 69. The universal joint 68 is on a line between the bearings 49 and 52 of the main frame 48 so as to allow for the relative movement between the frame and the parts carried thereby on the one hand and the parts movable with the base of the instrument on the other hand. The shaft 69 passes through a bearing 70 at the outer end of a bracket 71 extending from the standard 50.

The lower end of shaft 69 is connected by bevel gears 72 to a shaft 73 connected to a motor 74 controlled by a contact device 75 associated with the level gyroscope 55. The device includes a roller 76 attached to but insulated from the portion 60 of the double bail frame 59. The roller coacts with a pair of contacts 77 insulated from each other and from the gimbal ring 57 on which they are mounted. It will be understood that the roller is electrically connected to one main of a source of current supply (not shown) and the contacts are connected by conductors to the reversely wound field windings of the motor, the armature of which is connected by a conductor to the other main of the source of current.

The shaft 73 is also connected by bevel gears 78 to a second member of differential 39. The third member of differential 39 is connected through a shaft 80, bevel gears 81 and shaft 82 to a universal joint 83 in line with the bearings 49 and 52 of the main frame 48 and to which is connected a shaft 84 passing through a bracket 85 forming part of the main frame 48. Through gears 86 the shaft 84 drives a worm 87 meshing with a gear sector 88 forming part of the mounting of the angle gyroscope 54 as will presently be described.

The arcuate portion 53 of the main frame is provided on opposite sides of the bearing 52 with depending members 89 connected at their lower ends by a gear sector 90 meshing with a worm 91 on a shaft 92 connected to a motor 93 controlled by a contact device 94 associated with the level gyroscope 55. This device is similar to the contact device 75 previously described and includes a roller 95 on the end of a bracket 96 attached to but insulated from the case of the gyroscope 55. The roller coacts with a pair of contacts 97 insulated from each other and from a supporting bracket 98 extending upwardly from the portion of the gimbal ring 57 which serves as a bearing for one of the trunnions 56. The roller 95 is electrically connected to one main of a source of current supply (not shown) and the contacts are connected to the reversely wound field windings of motor 93, the armature of which will be connected to the other main.

The case of the angle gyroscope 54 is provided with trunnions 99 mounted in a gimbal ring 100 which in turn is mounted upon tubular trunnions 101 integral with the free ends of the arcuate portion 53 of the main frame 48. Also mounted upon the trunnions is a triple-bail frame 102 including a portion 103 to which the upper end of the gear sector 88 is attached, a portion 104 to which the other end of the sector is attached and a portion 105 shaped to conform generally to the case of the gyroscope and connected at its outermost part to portion 103 by a portion 106.

At its upper end the standard 50 carries a frame 107 having at its upper end an annular member 108 within which is a circular plate 109. The member has a cross-bar 110 having a bearing at its center for a trunnion 111 rigid with and projecting from the upper side of the plate 109. Extending downwardly from the plate is a pair of side arms 112 connected by a cross-bar 113 mounted at its center upon a trunnion 114 attached to the lower portion of frame 107. Below the cross-bar the side arms extend outwardly and carry at their lower ends trunnions 115 supporting the ends of a bail 116 which at its outermost portion is enlarged and carries a pin 117 threaded therethrough. The pin extends and bears in a corresponding enlargement at the junction of the portions 105 and 106 of the frame 102 and has a pointed inner end extending within a recess in a plug 118 of suitable material, such as cork, embedded in a recess in a projecting portion of the case of the angle gyroscope 54 as best seen in Fig. 5.

Connected to the bail 116 is a link 119 attached at its upper end to an arm 120 on a shaft 121 mounted in a bearing in one of the side arms 112 and in a bearing member 122 extending from the lower side of the plate 109. The shaft 121 also carries an arm 123 having a roller 124 at its free end. The roller bears against the lower edge of another arm 125 on a shaft 126 mounted in a bearing 127 on the underside of plate 109. The edge of the arm 125 is held against the roller 124 by a spring 128. The shaft 126 also carries an arm 129 to which is attached a link 130 extending to a reflecting prism 131 mounted between the ends of arms 132 extending upwardly from a circular plate 109.

Optically associated with the reflecting prism 131 is a pair of reflecting prisms 135 and 136. Optically associated with prism 135 are a pair of lenses 137, a pentaprism 138, a lens 139 and a telescope 140 for the trainer of the instrument. Similarly associated with the prism 136 are a pair of lenses 141, a pentaprism 142, a lens 143 and a telescope 144 for the use of the pointer of the instrument.

It will be understood that all of the optical elements, excepting the prism 131, are suitably mounted in fixed relation to the base 1 of the instrument.

Associated with the angle gyroscope 54 is a contact device 145 including a roller 146 on a bracket 147 attached to but insulated from the case of the gyroscope. The roller coacts with a pair of contacts 148 insulated from each other and from a bracket 149 by which they are carried upon the gimbal ring 100 of the gyroscope. The roller is electrically connected to one main of a source of current supply and the contacts are connected to the reversely wound field windings of the motor 16 the armature of which is connected through the switch 20 associated with the shifting lever 8, to a conductor leading to te other main. These elements constitute the means by which the training motor 16 is controlled by the angle gyroscope 54 as will be more fully explained hereinafter.

A similar contact device 150 is provided for controlling the elevation motor 36 by the angle gyroscope. An arm 151 is attached to but insulated from the gimbal ring 100 and carries a roller 152 coacting with a pair of contacts 153 insulated from each other and mounted on but insulated from the portion 105 of the triple-bail frame 102. The roller 152 is connected to one main of a source of current supply (not shown) and the contacts 153 are connected to the reversely wound field windings of the motor 36, the armature of which is connected to the other main, the circuit passing through the switch 40 associated with the shifting lever 29.

The angle gyroscope 54 is caused to precess to maintain its spinning axis directed at a target and thereby control the movements of the instrument in train and elevation.

For the purpose of applying the torque which causes the gyroscope to precess in train there is provided a shaft 154 operable in accordance with the rate of change of bearing of a target in the plane containing the line of sight and a horizontal line perpendicular to the line of sight. The rate of change of bearing is determined by suitable calculating mechanism such as disclosed schematically in Figs. 2 and 2a and which will be described in detail after the present explanation of the apparatus of Fig. 1 has been completed.

The shaft 154 is provided with a pinion 155 for driving a dial 156 reading against a pointer 157 to show the value of the input introduced into the apparatus of Fig. 1 by the shaft. The shaft is connected through bevel gears 158 to a shaft 159 mounted in a bracket 160 extending from the top of the standard 47.

As shown most clearly in Fig. 3 the lower portion of shaft 159 is screw-threaded through a lug 161 projecting from a carriage 162 movably mounted, as by means of rollers 163, within a channel 164 in one side of the standard 47. Pivotally mounted on the carriage 162 is a lever 165 having a substantially vertical arm 166 and an arm 167 inclined to the other arm. A tension spring 168 is connected at its lower end to the free end of arm 167 and at its upper end to a rod 169 mounted in brackets 170 extending from the carriage 162. The upper end of the rod 169 is screw-threaded and carries a nut 171 by which the tension of the spring may be adjusted. The carriage has an index mark 172 reading against a scale 173 on the standard 47. Pivotally attached to the upper end of the vertical arm 166 is a forked member 174 carrying a pair of rollers 175 which are pressed by the spring 168 against a rod 176 pivoted at 177 to the standard 47. The lower end of the rod carries a coil 178 electrically connected by conductors 179 with the armature 180 of generator 22, the field 181 of which is connected by conductors 182 to the mains 183 of a source of current supply. The coil 178 surrounds a pole-piece 184 of an electromagnet 185 having its coil 186 connected to the mains by conductors 187 and its other pole-piece 188 shaped to terminate near the bottom of the coil 178.

The upper end of the rod 176 is connected by a strap 190 to an arm 191 pivoted at its lower end upon the bracket 71 of the standard 50. The arm 191 passes through the forked end of an arm 192 pivoted at 193 in one of the side members of the main frame 48. The other end of the arm 192 engages a rod 194 passing through one of the hollow trunnions 101 and engaging an arm 195 on a shaft 196 suitably mounted on the portion 104 of the triple-bail frame 102 of the angle gyroscope. The other end of the shaft 196 carries an arm 197 which is connected by a link 198 to the gimbal ring 100 at a point near the lower trunnion 99. This gimbal ring has an arm 199 to which is connected one end of a spring 200, the other end of which is connected to an arm 201 attached to the portion 103 of the triple-bail frame 102.

The scale 173 reads in opposite directions from a zero point and the parts are so proportioned that when the index mark 172 on carriage 162 coincides with the zero point, the force applied to the angle gyroscope by the spring 168 acting through the lever 165, rod 176, strap 190, arms 191 and 192, rod 194, arms 195 and 197 and link 198 is exactly balanced by the force exerted by the spring 200 connected between the triple-bail frame 102 and the gimbal ring 100 to which the link 198 is connected, so that under these conditions no torque is applied to the angle gyroscope about the axis of its trunnions 101—101.

Similar mechanism is provided for applying a torque to the angle gyroscope to cause it to precess in elevation. This mechanism includes shafts 202 operable in accordance with the rate of change of elevation dA as determined by the calculating mechanism disclosed in Fig. 2. One of the shafts 202 is provided with a pinion 203 for driving a graduated dial 204 reading against a pointer 205 to show the value of the input introduced by shafts 202. The shafts 202 are connected by bevel gears 206 to a shaft 207 mounted in a bracket 208 at the top of the standard 47, as shown most clearly in Fig. 3. The shaft 207 is provided with a screw-threaded portion extending through a lug 209 projecting from a carriage 210, similar to the carriage 162 and its associated elements and mounted by rollers 211 in a channel in the opposite side of the standard 47. The carriage bears an index mark 212 readable against a scale 213 on the standard.

The carriage 210 carries a lever 214 having a vertical arm 215 and an arm 216 inclined thereto. The free end of the latter arm of the lever is connected to a spring 217 attached to a rod 218 passing through brackets 219 projecting from the carriage 210 and provided at its upper end with an adjusting nut 220. The upper end of the vertical arm 215 carries a pair of rollers 221 engaging a rod 222 pivoted at 223 to the standard 47, and carrying at its lower end a coil 224 connected by conductors 225 to the armature 226 of the generator 42, the field 227 of which is connected by conductors 228 and 182 to the mains 183. The coil 224 surrounds one pole-piece 229 of an electromagnet 230, the coil 231 of which is permanently connected to the mains 183. The other pole-piece is shaped to be near the bottom of the coil 224.

The upper end of the rod 222 is connected by a strap 232 to an arm 233 pivoted on the bracket 71 of the standard 50 and passing through the forked end of an arm 234 pivoted at 235 in the other side member of the main frame 48. The other end of the arm 234 engages a rod 236 movably mounted in one of the hollow trunnions 101 and engaging one end of a crank 237 pivoted upon the portion 104 of the triple-bail frame 102 and connected at its other end to a link 238 attached to the case of the angle gyroscope. The gimbal ring 100 carries a bracket 239 connected by a spring 240 to a bracket 241 attached to the case of the gyroscope.

As in the case of the mechanism for precessing the angle gyroscope in train, the parts above described are so proportioned that when the index mark 212 of the carriage 210 coincides with the zero point of the corresponding scale 213, the force applied to the gyroscope by the spring 217 through lever 214, rod 222, strap 232, arms 233 and 234, rod 236, crank 237 and link 238 is exactly balanced by the force exerted by the spring 240 connected between the gimbal ring 100 and the case of the gyroscope to which the link 238 is also attached, so that under these conditions no torque is applied to the gyroscope about the trunnion axis 99—99.

The arms 167 and 216 of levers 165 and 214 respectively are so inclined with respect to the springs 168 and 217 of the levers that any changes in position of the rods 176 and 222 are not accompanied by any changes of pressure of the rollers 175 and 221 respectively and therefore no changes in the torques applied to the angle gyroscope by these elements. The forces exerted by the springs upon the rods would normally vary with changes in the lengths of the springs, but the parts are so proportioned that there are compensating changes in the effective leverages of the inclined arms 167 and 216, so that the resultant forces applied to the rods are substantially constant.

Similarly the springs 200 and 240 are so connected that small variations in the position of the gyroscope tending to alter the length and consequently the pull of the springs are so compensated through the moment arm of the point of connection that the torque applied to the gyroscope remains substantially constant.

As gyroscopes are subject to straying or wandering from their true positions provision is made in the instrument for compensating for such straying as otherwise errors in the positioning of the elements of the apparatus which depend upon the level gyroscope 55 would be introduced. For the purpose of detecting straying the top of the case of the gyroscope may carry a spirit level 242 in which departure of the bubble from its central position indicates straying.

In general, compensation for straying is produced by precessing the gyroscope back to its normal position by the application of a torque of the required magnitude about one or both of its supporting axes. For this purpose there is provided a handle 243 centralized by a spring 244 and attached to a rod 245 mounted in suitable bearings and provided with an arm 246 having a forked extremity which engages the lower end of a lever 247 pivotally mounted at 248 on the bracket 71 of the standard 50. The upper end of the lever is connected by a spring 249 to a member 250 attached to the upper portion of the standard 50. At an intermediate point the lever 247 engages one arm of a bell crank 251 pivotally mounted at 252 upon one of the side members of the main frame 48. The other arm of this bell crank engages a rod 253 slidably mounted in the corresponding hollow trunnion 58. The inner end of the rod engages the upper end of an arm 254 attached to a shaft 255 mounted in a bearing 256 in the portion 61 of the double-bail frame 59. A spring 257 is connected between the arm 254 and the portion of the frame just referred to. An arm 258 is attached to the other end of shaft 255 and has attached to its free end a strap 259 terminating in an eye loosely surrounding a pin 260 projecting inwardly from the gimbal ring 57 below the corresponding trunnion 56.

A substantially similar arrangement is provided for applying a torque about the other axis of the level gyroscope. This consists of a handle 261 having a centralizing spring 262 and attached to a rod 263 mounted in suitable bearings and having an arm 264 the forked end of which engages the lower end of a lever 265 pivotally mounted at 266 upon the bracket 71 and connected at its upper end by a spring 267 to the member 250. At an intermediate point the lever 265 engages a bell crank 268 pivoted at 269 upon one of the side members of the main frame 48. The other end of the bell crank 268 engages a rod 270 slidably mounted in one of the hollow trunnions 58. The inner end of the rod engages the upper end of a bell crank 271 pivoted on the portion 61 of the double-bail frame 59 and connected to this portion by a spring 272. Attached to the other end of the bell crank 271 is a strap 273 terminating in an eye which loosely surrounds a pin 274 projecting from the case of the level gyroscope 55.

Referring to Fig. 2, the shaft 23 leading from Fig. 1 and operable in accordance with relative target bearing is connected to one member of a differential 275, a second member of which is connected to the shaft 276 which is operable in accordance with the true course of the ship on which the instrument is mounted, usually referred to as "Own Ship" and designated C$_O$. The shaft 276 is operated by a receiver motor 281 actuated by the gyroscopic compass on Own Ship. By virtue of the structure just described, the third member of the differential 275 will be actuated in accordance with the true target bearing, which movement is imparted to a shaft 286, from which a shaft 287 leads to one member of a differential 288, a second member of which is geared to a shaft 289 provided with a crank 290 by which values of the estimated course of the target, C$_T$, may be introduced into the instrument. The output of the differential 288 is represented by the resulting movement of its third member and shafts 291 driven thereby to represent the target angle, designated T$_A$. By means of a gear 292 driven by shaft 291, the values of this factor are introduced into a unit hereinafter referred to as a "target component solver" and designated generally as 293.

The gear 292 engages a target angle gear 294 provided with a slot 295 (Fig. 6) within which is a slidable block 296 carrying a rod 297, the forward end of which extends into a spiral groove 298 in a target speed gear 299. The last named gear meshes with a pinion 300 operatively connected with one member of a differential 301. The gear 294 meshes with a pinion 302 driven by a shaft 303 connected to a second member of differential 301. The third member of the differential 301 is connected to a shaft 306 having a crank 307 whereby values of the estimated speed of the target S$_T$ may be introduced into the instrument.

In the operation of the parts just described and regarding the shaft 306 as fixed, the movement imparted to the target angle gear 294 from the differential 288 when values of the course of the target are being introduced, will through pinion 302, shaft 303, differential 301 and pinion 300 turn the target speed gear 299 in unison with the target angle gear 294.

When, however, the shaft 306 is turned by the crank 307 in accordance with the estimated speed of the target, it will turn the corresponding member of differential 301. Regarding the shaft 303 as fixed since it is connected to the target angle gear 294, pinion 300 will be turned to shift the position of the target speed gear 299 with respect to the target angle gear. As the target speed gear turns the rod 297 which fits in the groove 298 will be shifted radially of the gear to a position representing the estimated speed of the target.

The rod 297 extends on the other side of the block 296 into intersecting slots 308 and 309 in a pair of component slides 310 and 311 respectively. The positioning of the slides is determined by the positioning of the rod in accordance with the displacement imparted to it by the target angle gear 294 and the target speed gear 299. The arrangement is such that the slide 310 is positioned in accordance with the horizontal lateral deflection of the target due to its own speed, that is, the horizontal component of the speed of the target perpendicular to the line of sight.

The other slide 311 is positioned in accordance with the rate of change of the horizontal range due to movement of the target.

The horizontal arm of slide 310 is provided with a rack engaging a pinion 312 on a shaft 313 which is connected to one member of a differential 314, a second member of which is connected to a shaft 315 leading to one member of a differential 316, a second member of which is connected to a shaft 317 operable in accordance with the lateral deflection due to the wind by a wind component solver 293W similar to the target component solver 293.

The third member of the differential 316 is connected to a shaft 318 operable in accordance with the lateral deflection due to the movement of Own Ship by a own ship component solver 293S. The shaft 315 is therefore operable in accordance with the sum of these factors as is also the second member of the differential 314. Since the first member of differential 314 is operable in accordance with the horizontal lateral deflection of the target, the third member will represent the sum of all of these factors. A shaft 319 is connected to the third member and receives a corresponding displacement which it transmits to one member of a differential 320, a second member of which is connected by a shaft 321 to a cam disc forming part of a switch 322 which is shown diagrammatically in view of the fact that devices of this nature are well known in the art. Briefly described, the switch includes a pivoted contact arm 323 connected to one main of a source of current supply (not shown) and adapted to be displaced by the cam into engagement with one or the other of a pair of fixed contacts 324 to establish a circuit through one of a pair of conductors, shown as a single cable 325 leading to a motor 328 from which a return conductor 329 leads to the other supply main.

The direction of rotation of the motor 328 is therefore determined by the direction of rotation imparted to the cam of the switch 322 from the shaft 319 through differential 320 and shaft 321. Through a pinion 330 the motor drives a gear 331 on a shaft 332 which has a branch shaft 333 connected to the third member of differential 320. As the motor drives the shaft 332 the second member of differential 320 will be driven in a direction opposite to which it was driven from the first member by the shaft 319, to actuate the switch 322 to open the circuit of the motor. These operations occur simultaneously with the result that the shaft 332 is driven in accordance with the movement of shaft 319 and with increased power due to the interposition of the motor. The shaft 332 carries a dial 334 to show the values of the relative knots component of the target across the line of sight in the inclined plane.

While the relative knots component of the target across the line of sight is the same in the inclined plane as it is in the horizontal plane the direct range R is different in the inclined plane from the horizontal range R$_H$ to a point directly under the target. Therefore the angular rate in the inclined plane expressed as $dB_N$ differs from the angular rate in the horizontal plane expressed as $dB$. Inasmuch as the relative knots component of the target is proportional to angular rate multiplied by the range the knots component in an inclined plane equals $RdB_N$ and the knots component of the target in a horizontal plane equals $R_H dB$. Inasmuch as these knots components are equal $R dB_N$ equals $R_H dB$.

Another branch of shaft 332 drives a pinion 335 engaging with a rack on the lower side of a slide 336 movable horizontally in accordance with the quantity $R dB_N$. A slotted bar 337 is attached at its lower end to the slide 336 and at its upper end is positioned by a fixed pin 338. Fitting within the bar is a pin 339 projecting from a member 340 slidably mounted on the horizontal arm of a T-shaped member 341 having at the lower end of its vertical arm a pin 342 which fits within a groove 343 in a gear 344 turnable in accordance with the range R of the target.

A crank 345 turnable by an operator known as a range setter is attached to a shaft 346 the other end of which is connected to one member of a differential 347, the second member of which drives a shaft 348 to position a pinion 349 engaging the gear 344 and a range dial 350. Considering at present the third member of the differential 347 as fixed, the movement imparted to the shaft 346 by the crank 345 will position the shaft 348 and the gear 344 in accordance with the direct range of the target. The cam groove 343 in this gear is formed in accordance with the reciprocal of the range values so that the vertical movement imparted to the member 341 is in accordance with $$\frac{1}{R}$$

Therefore the pin 339 will be adjusted vertically in accordance with $$\frac{1}{R}$$

and horizontally by the movement of the slide 336 in accordance with $R dB_N$ thus multiplying these quantities and giving $dB_N$.

The pin 339 also passes through the slot in a vertical arm of a slide 351, the horizontal arm of which will therefore be moved in accordance with $dB_N$. The lower edge of this arm is provided with a rack engaging a pinion 352 which positions the shaft 154 which as previously described leads from the mechanism of Fig. 1.

The wind component solver 293W and the ship component solver 293S are in all respects similar to the target component solver 293 and therefore the corresponding parts and connections are designated by the same numbers with the suffixes W and S respectively.

The angle settings of the component solvers are indicated by dial groups 353 and 354. Shaft 291 positions a dial 355 relative to a fixed index 356 in accordance with target angle which is the angle input to the target component solver 293. Shaft 291W positions a ring dial 357 relative to the index 356 in accordance with the wind angle which is the direction of the wind relative to the line of sight and is the angle input to the wind component solver 293W. Dial 358 is set by shaft 23 relative to the fixed index 359 in accordance with the relative target bearing, which is the angle input to the ship component solver 293S. Ring dials 360 in each group are positioned by shaft 286 in accordance with the true target bearing. When dials 355, 357 and 358 are read against ring dial 360 they indicate target course, wind direction and Own Ship course respectively.

Reference has been made to the target component solver 293 as having a slide 311 representing the horizontal range rate of the target, $dR_H$. The vertical arm of this slide is provided with a rack engaging a pinion 365 driving a shaft 366 connected to one member of a differential 367, a second member of which is connected to a shaft 368 leading to one member of a differential 369, a second member of which is connected to a shaft 370 operable in accordance with the range rate due to the wind in any suitable manner. The third member of differential 369 is connected to a shaft 371 operable in accordance with the range rate due to the movement of Own Ship. The shaft 368 is therefore operable in accordance with the sum of these factors as is the second member of differential 367. Since the first member of differential 367 represents the range rate due to the target, the third member will represent the sum of all these factors. A shaft 372 is driven by the third member of differential 367 and receives a corresponding displacement, $dR_H$, which it transmits to one member of a differential 373, a second member of which is connected by a shaft 374 to a switch 375 like the one 322 previously described. The switch 375 controls the circuit of a follow-up motor 376 which by means of a pair of gears 377 drives a shaft 378 connected to the third member of differential 373. The operation of these elements is obvious in view of the explanation previously given of motor 328 and its associated elements.

The movement of the shaft 378 is transmitted to the center of a differential 379 shown on an enlarged scale in Fig. 4 with other parts of the mechanism about to be described. One side of the differential is connected through a gear train 380 to the shaft 46 which as previously described is turned in accordance with the angle A representing the elevation of the target. The shaft 46 carries at its end a gear 381 meshing with the segmental gear portion 382 of a ring 383 to which is attached a U-shaped frame 384 having a pair of guideways 385 on which is slidably mounted a block 386 adapted to be positioned by a screw 389 mounted in the frame and actuated through a pair of bevel gears 390 from a shaft 391 supported in a bracket 392 attached to the frame 384. The shaft 391 carries a pinion 393 which meshes with an annular gear 394. The gear 394 is connected through a pinion 395, shaft 396 and pinion 397 to the second side of the differential 379.

The gear 381 on the shaft 46 is connected through an idler 398 to one side of a differential 399. The center of this differential is attached to a shaft 400 which as shown in Fig. 2 may be adjusted by a crank 404. The crank 404 is adapted to be set in accordance with the rate of climb of the target, this quantity being designated $dC$. The shaft 400 is also connected to a dial 405 for indicating the rate of climb.

As shown most clearly in Fig. 4 the second side of the differential 399 is extended and carries a gear 406 which through an idler 407 drives an annular gear 408 similar to gear 394. The gear 408 drives through a pinion 409, a shaft 410 mounted in brackets 411 attached to one arm of the frame 384. Through bevel gears 412 the shaft 410 drives a pinion shaft 413 mounted between the outer ends of the arms of the frame 384. The pinion shaft engages a rack 414 carried upon a pair of rods 415 extending from a member 416 slidably mounted in the block 386 for movement in direction at right angles to the direction of movement of the block on the frame 384. Attached to the rack 414 is a rod 417 passing through the slotted vertical arm of a horizontally movable slide 418 and the slotted horizontal arm of a vertically movable slide 419.

In the operation of the elements of the instrument that have just been described the rotation of the shaft 46 in accordance with the elevation angle of a target will through the pinion 381, gear sector 382 and ring 383 position the frame 384 in accordance with the angle A, as shown in Fig. 2 as distinguished from Fig. 4 in which the frame is shown in its horizontal position as it would be for a surface target in which case the angle A equals zero. At the same time the shaft 46 will through gear train 380 drive one side of the differential 379 and regarding its center as fixed the other side will through pinion 397, shaft 396 and pinion 395, drive the annular gear 394 in unison with the ring 383. The shaft 46 will also through pinion 381 and idler 398 drive one side of the differential 399 and regarding the center as fixed the other side will be turned and through the gears 406 and 407 drive the annular gear 408, so that under these conditions the ring 383 and the annular gears 394 and 408 will be rotated in unison and the frame 384 will be positioned in accordance with the elevation angle of the target, no movement being imparted to the block 386 or the rack 414 relative to the ring 383. In other words, the two annular gears 394 and 408, the ring 383 and the frame 384 with its associated elements will simply turn from the position shown in Fig. 4 into the position shown in Fig. 2.

It has been explained that the shaft 378 is driven in accordance with the quantity $dR_H$ and now regarding the shaft 46 as fixed the shaft 378 will drive the center of the differential 379 and through pinion 397, shaft 396 and pinion 395 the annular gear 394 will be displaced with respect to the ring 383 which will now be regarded as fixed. The movement of annular gear 394 relatively to ring 383 will through the pinion 393, shaft 391, bevel gears 390 and screw 389 position the block 386 in accordance with the quantity $dR_H$.

Assuming now that the crank 404 is turned in accordance with the estimated rate of climb of the target, the shaft 400 will correspondingly turn the center of the differential 399. Regarding one side of the differential as being fixed since it is connected to the shaft 46 which is now regarded as fixed, the other side will be turned to drive through the gears 406 and 407, the annular gear 408 relatively to the ring 383. This movement of the gear 408 will be therefore transmitted to the pinion 409, shaft 410, bevel gears 412 and pinion shaft 413 to position the rack 414 in accordance with the rate of climb of the target, that is in accordance with the quantity $dC$.

As a result of the operations described above the rod 417 will be positioned by the block 386 in accordance with the quantity $dR_H$ and by the rack 414 in accordance with the quantity $dC$. The movement imparted to the rod 417 will position the slide 418 in accordance with the rate of change of direct range, $dR$, for this equals $dR_H \cos A + dC \sin A$.

The movement imparted to the vertical slide 419 is in accordance with the component of the target's travel across the line of sight in a vertical plane and is designated as $RdA$. This quantity equals $dC \cos A - dR_H \sin A$.

The vertical movement of the slide 419 is transmitted through a pinion 420 to one member of differential 421, a second member of which is attached to a shaft 422 which operates a contact device 423 similar to those previously described and represented diagrammatically as was the device 375. The device 423 controls a motor 424. Through a shaft 425 the motor drives the third member of the differential 421 and also a slide 426. As in the case of the quantities $RdB_N$ and $dR_H$ the elements just described constitute a follow-up system by which the movement of the vertical slide 419 is transmitted to the slide 426 to operate it with increased power from the motor 423.

Attached to the slide 426 is a slotted bar 427, the upper end of which is located by a fixed pin 428. A pin 429 is attached to a member 430 slidably mounted on the horizontal arm of the $$\frac{1}{R}$$

member 341, similar to the pin 339 and member 340 previously described. The pin 429 also passes through the slotted vertical arm of a horizontally movable slide 431. Since the slide 426 and therefore the bar 427 positioned in accordance with the quantity $RdA$ while the pin 429 is positioned in accordance with $$\frac{1}{R}$$

the movement imparted to the slide 431 will be the product of these quantities or $dA$. A rack on the slide 431 is connected to position shaft 202 leading to Fig. 1.

It has been previously described that the slide 418 is displaced horizontally in accordance with the rate of change of range, $dR$. The movement imparted to this slide is transmitted through a pinion 432 to a shaft 433 which turns a dial 434 showing the values of this quantity. The shaft 433 at its other end drives a pinion 435 meshing with a rack 436 connected to the ball carriage 437 of a variable speed device 438 consisting of a disc 439 driven at constant speed by a shaft 440 and a roller 441 connected to a shaft 442 which drives the third member of the differential 347. Assuming that the first member of the differential is held fixed after an initial setting by the crank 345 and shaft 346, the second member of the differential will be driven and through shaft 348 and pinion 349, the inverse range gear 344 will be automatically driven from the variable speed device 438 as will also the range dial 350 at the other end of shaft 348.

In the operation of the instrument described above, the target to which it is to be aimed is first picked up by the trainer and pointer by slewing operations. The levers 8 and 29 are shifted from the positions shown in Fig. 1 to their alternative positions in which the larger gears of the pairs 7 and 28 are in engagement with the pinions 17 and 34 respectively on shafts 12 and 33. At the same time the circuits of the motors 16 and 36 are broken by opening the switches 20 and 40 respectively.

There is thus established a direct drive from the trainer's hand-wheels 3 through shaft 4, shaft 6, larger gear of pair 7, pinion 17, shaft 12, and pinion 13 whereby the instrument may be rapidly trained until the image of the target produced by the optical elements appears in the field of view of the trainer's telescope 140, provided the pointer who is simultaneously operating the elements under his control has suitably adjusted the prism 131 as will now be described.

The pointer by manipulating his hand-wheels 24 will drive shaft 25, shaft 27, larget gear of pair 28, pinion 34, shaft 33, bevel gears 37, shaft 38, differential 39, shaft 80, bevel gears 81, shaft 82, universal joint 83, shaft 84, gears 86, worm 87 to turn the gear sector 88 and the triple-bail frame 102 of the angle gyroscope to which the sector is attached. Through the pin 117 fitting within the recess in the end of the casing of the gyroscope, the latter will be caused to follow the movement of the triple-bail frame within which it is mounted.

Through the pin 117 the bail 116 will be correspondingly turned and through the link 119, arm 120, and shaft 121 turn the arm 123. Since the roller 124 is held in contact with the arm 125 the latter will be turned but only through one-half the angle through which the arm 123 is turned. The movement imparted to this arm will be transmitted to the reflecting prism 131 to turn it through one-half the angle of elevation of the target so that the image of the target is brought into the field of view of the pointer's telescope 144, the image being formed by the optical elements provided for this purpose.

As a result of the preliminary slewing operations described above, the lines of sight of the trainer's and pointer's telescopes will be directed at the selected target. The training movement imparted to the instrument to accomplish this purpose produces a corresponding movement of shaft 23 and the member of the differential 275 to which it is connected, as shown in Fig. 2, and in which it is combined with the course of Own Ship Co to give the true target bearings.

The slewing operation in elevation produces a corresponding movement of shaft 46 which introduces the quantity A into the computing mechanism of Fig. 2 as previously explained in describing the mechanism of Fig. 4.

To put the instrument into condition for automatic operation the levers 8 and 29 are operated to shift the pairs of gears 7 and 28 into the positions shown in Fig. 1, i. e. with the smaller gears of the pairs in engagement with pinions 9 and 30 respectively. Shifting of the levers will close the switches 20 and 40 to establish the circuits of motors 16 and 36 respectively. The motor circuits are broken during the slewing operations to prevent the motors from having any effect upon the differentials 11 and 32 due to possible establishing of their control circuits through the contact devices associated with the angle gyroscope.

It will be understood that even during the slewing operations the level gyroscope 55 will be in operation, and except for straying, maintains its plane of rotation fixed in space. Due to the cross-roll of the craft, there will be relative movement between the level gyroscope 55 and its supporting ring 57 about the axis 56 and also between the roller 95 and the contacts 97 of the contact device 94 to energize the follow-up motor 93. The motor will through shaft 92, worm 91 and gear sector 90 turn the main frame 48 and the ring 57 until the roller of the control device occupies its normal relation to the fixed contacts. In other words, the main frame and its associated elements are stabilized against the cross-roll of the craft.

The relative movement between the main frame 48 and elements which move with the craft changes the relation between the ends of the arcuate portion 53 of the frame and the adjacent lower ends of the side arms 112. Due to the connection from the trunnions 101 at these ends of the main frame through the triple-bail frame 102, pin 117 and bail 116 to which the lower ends of the side arms 112 are connected, there is a readjustment of these parts whereby the side arms are turned about the inclined axis through the trunnions 111 and 114 to cause the circular plate 109 to be correspondingly turned. As this plate turns it also turns the arms 132 between which the prism 131 is mounted so as to turn the prism sufficiently to compensate for the effect of cross-roll upon the images of the target in the fields of view of the trainer's and pointer's telescope 140 and 144 respectively. In other words, the fields of view of these telescopes are stabilized against the effect of cross-roll by compensating relative movement between the prism 131 and the remaining optical elements which partake of the cross-roll of the craft.

As a result of movement of the craft in the vertical plane including the bearings 49 and 52 of the frame 48 there will be relative movement between the double-bail frame 60, 61 and the gimbal ring 57 within which the level gyroscope is mounted. There will therefore be relative movement between the roller 76 and the contacts 77 to establish the circuit of the motor 74. The energization of the motor 74 will through shaft 73, bevel gears 72, shaft 69, universal joint 68, shaft 67, pinions 66, shaft 64, worm 63 and gear sector 62 turn the double-bail frame 60, 61 until the roller 76 occupies its normal position upon the insulation between the contacts 77. The elements thus constitute a follow-up system by which the double-bail frame 60, 61 is maintained in its normal relation to the level gyroscope 55.

The motor 74 through its shaft 73, bevel gears 78, differential 39, shaft 80, bevel gears 81, shaft 82, universal joint 83, shaft 84, gears 86, worm 87 and gear sector 88 maintain the triple-bail frame 102 stabilized irrespective of the roll of the craft. The operation above described maintains the elements such as the triple-bail frame 102 and the bail 116 stabilized. Since the bail 116 controls the position of the prism 131 the latter will be maintained in a position to keep the target in the field of view of the telescopes irrespective of movement of the optical elements which move with the craft.

When the instrument is operating automatically the computing mechanism shown in Fig. 2 will function as hereinbefore explained in detail, to receive certain inputs, such as relative bearing of the target, $B_T$, the course of Own Ship Co, the estimated course and speed of the target, $C_T$ and $S_T$ respectively, the elevation angle A, the estimated range R and the rate of climp $dC$. From these inputs, the mechanism will determine certain outputs, such as the rate of change of the bearing of the target in the plane of the line of sight and a horizontal line perpendicular to the line of sight, designated $dB_N$, the rate of change of elevation, $dA$, and the rate of change of range $dR$.

The first named output is transmitted by shaft 154 to shaft 159 and its associated elements of Figs. 1 and 3. The shafts will be turned in one direction or the other according to the direction of the target with respect to the instrument. The carriage 162 will be displaced to a corresponding position and there will be a corresponding displacement of the rollers 175 on the rod 176. Assuming that the carriage is displaced downwardly from the position shown in Fig. 3, there will be a corresponding increase of the effective lever arm between the pivot 177 and the point at which the spring 168 applies its force to the rod 176 through the lever 165 and rollers 175. The increased force due to the increased lever arm will be transmitted through the strap 190, arms 191 and 192, rod 194, arm 195, shaft 196, arm 197 and wire 198 to the angle gyroscope 54 where it will overcome the opposing force exerted by the spring 200 to apply a torque to the gyroscope about the trunnion axis 101—101 to cause the gyroscope to precess about its trunnion axis 99—99 in the direction to follow the target.

Conversely if the carriage 162 be displaced upwardly from the position shown in Fig. 3 the effective lever arm of the rod 176 between the pivot 177 and the rollers 175 will be lessened so that the spring 200 associated with the angle gyroscope will overbalance the effect of the spring 168 applied through the strap 190 and the connected elements as previously described to cause a torque to be applied to the angle gyroscope about the trunnion axis 101—101 in the opposite direction to cause reverse precession about the trunnion axis 99—99.

In either case, as soon as the gyroscope precesses about its trunnion axis 99—99 the roller 146 carried by the gyroscope will be displaced from its normal position on the insulation between the contacts 148 carried by the gimbal ring 100 to establish a circuit for motor 16. The resultant energization of the motor 16 will turn the differential 11 and since the trainer's hand-wheels 3 at this time are assumed to be fixed, the differential will through the shaft 12 and the pinion 13 turn the base 1 of the instrument within the rack 2 to cause the instrument to be automatically driven in accordance with the rate of movement of the target in train as determined by the computing mechanism.

In practice, the rate of change of bearing of the target as determined by the instrument may differ from its true rate due to errors in the estimated inputs such as range or target course and speed. Such difference will be manifest to the trainer by a departure of the target from the vertical cross wire of his telescope. Upon noticing such a deviation he will manipulate his hand-wheels 3 to restore the target to the cross wire. That is accomplished through the shaft 4, shaft 6, smaller gear 7, pinion 9, differential 11, shaft 12, and pinion 13 to produce a slight manual training of the instrument to correct for the deviation of the target. At the same time, the shaft 6 will through shaft 21 drive the armature 180 of the generator 22, the field 181 of which is energized from the mains 183 over conductors 182.

The current generated by the movement of the armature will energize the coil 178 with a polarity depending upon the direction or rotation of the armature of the generator which in turn depends upon the direction in which the trainer's hand-wheels are turned to restore the target to the cross wire of his telescope. The energization of the coil 178 will result in a repulsion or attraction of the coil by the poles 184 and 188 of the electromagnet 185 so that there will be a corresponding force acting on the rod 176 to which the coil is attached. This will either increase or decrease the force applied to the angle gyroscope through the strap 190 and connected elements as previously described according to the direction of the force resulting from the energization of the coil 178. There will, therefore, be a corresponding change in the torque applied to the angle gyroscope to alter its rate of precession and this change will be accompanied by a corresponding change in the rate at which the instrument is trained under the control of the angle gyroscope. In order that the changes in torque applied shall produce corresponding changes in the precession of the gyroscope the speed of its rotor should be maintained constant.

In order that the instrument may be maintained in corrected condition after the above described operations have been performed it may be necessary to make correctional adjustment of some or all of the input elements to alter the outputs of the computing mechanism. This will change the torque applied to the angle gyroscope to cause it to continue to precess at the correct rate to maintain the vertical cross wires of the trainer's and pointer's telescopes on the target.

Simultaneously with the automatic operation of the instrument in train there will be a similar operation in elevation. To produce this the shaft 202 is operable in accordance with the computed rate of change of elevation of the target, dA. Through bevel gears 206 and shaft 207 carriage 210 will be displaced from its zero position in one direction or the other according to whether the elevation of the target is increasing or decreasing. As in the case of the training elements, displacement of the carriage downwardly from the position shown in Fig. 3 will increase the effective lever arm between pivot 223 and rollers 221 to cause a force to be applied through strap 232, arms 233 and 234, rod 236, lever 237, and wire 238 to the angle gyroscope 54 about the trunnion axis 99—99 to overbalance the force applied about this same axis by the spring 240 connected between the gyroscope and the gimbal ring 100. The torque thus applied to the gyroscope will cause it to precess about its trunnion axis 101—101 in the required direction to follow the target in elevation.

Also as in the case of the training elements, a displacement of the carriage 210 upwardly from the position shown in Fig. 3 will cause a decrease in the force applied to the angle gyroscope through the strap 232 and connected elements as described above so that the spring 240 will predominate in applying a torque to the gyroscope about the trunnion axis 99—99 to cause it to precess about the other trunnion axis 101—101 in the opposite direction.

In either case the precessional movement of the gyroscope will carry with it the gimbal ring 100 and there will be relative movement between the roller 152 carried thereby and the contacts 153 mounted on the surrounding triple-bail frame 102. The resultant energization of the motor 36 will drive the differential 32 and the shaft 33 to which it is connected. The movement imparted to this shaft 33 will be transmitted through bevel gears 37, shaft 38, differential 39, shaft 80, bevel gears 81, shaft 82, universal joint 83, shaft 84, gears 86 and worm 87, the gear sector 88 and the triple-bail frame 102 to which it is connected. The elements above described thus constitute a follow-up system by which the frame will be automatically maintained in its normal relation to the angle gyroscope in elevation as the latter precesses.

The motion imparted to the triple-bail frame 102 will be transmitted through pin 117 to the bail 116 and thence through the link 119, arms 120, 123, 125, 129 and link 130 to the prism 131 to alter its position in accordance with the changing elevation of the target to maintain the latter in the field of view of the trainer's and pointer's telescopes provided the instrument has been accurately adjusted.

In practice, however, a correction of the determined rate of change of elevation of the target is usually required due to errors in originally estimating the input values. This is made by the pointer who observing a deviation of the target from the horizontal cross wire of his telescope manipulates his hand-wheels 24 to turn the differential 32 through shaft 25, shaft 27, smaller gear 28, and pinion 30. Regarding the motor 36 as fixed stationary the differential 32 will drive the shaft 33, bevel-gears 37, shaft 38, differential 39, shaft 80, bevel gears 81, shaft 82, universal joint 83, shaft 84, gears 86, worm 87 and gear sector 88 to alter the position of the triple-bail frame 102 and therefore the bail 116 connected thereto by the pin 117. The correcting movement thus imparted to the bail 116 will be transmitted through the links and arms previously described to the prism 131 to change it sufficiently to restore the horizontal cross wires of the telescopes to the target.

While a correctional movement is being imparted to the prism the armature 226 of the generator 42, shown in Fig. 3, will be rotated from shaft 41. Since the field 227 of this generator is energized by conductors 228 current will be supplied to the coil 224 attached to the end of rod 222 over conductors 225. This coil functions in the manner already described in connection with coil 178 and through strap 232 and the connected elements applies a connectional torque to the angle gyroscope to cause it to precess about its trunnion axis 101—101 as the triple-bail frame is manually moved by the pointer so that the gyroscope and frame maintain their normal relation to each other while the correctional adjustment is being made in the position of the prism 131. Any deviation between the gyroscope and the frame during this operation causes the motor 36 to be energized by the resulting relative movement between the roller 152 and contacts 153. The motor acting through the differential 32 superimposes upon the movement being imparted to shaft 33 and the triple-bail frame 102 by the pointer a correctional movement to cause the frame to follow the movement of the gyroscope.

As in the case of training corrections, it is necessary to alter the rate of change of elevation as originally set up in the instrument by suitable adjustment of the input element in order that the target may be accurately followed by the instrument.

It will be understood that throughout the operation of the instrument the level gyroscope 55 is continually functioning in the manner already described to compensate for the effect upon the instrument of roll and cross-roll of the craft while the angle gyroscope and the associated computing mechanism mutually control each other to automatically determine the changing rates in train and elevation necessary to maintain the lines of sight of the telescopes upon the target in both train and elevation.

I claim:

1. A fire control instrument comprising a gyroscope mounted for movement about an axis, a stable element operative to maintain a stable reference plane, means for applying a torque to the gyroscope to cause it to precess about said axis, and means responsive to the movement of the gyroscope about its axis with respect to the reference plan to vary the said precessional torque.

2. A fire control instrument comprising a gyroscope mounted for movement about an axis, a stable element operative to maintain a stable reference plane, means for applying a torque to the gyroscope to cause it to precess about said axis, direction indicating mechanism, means operatively coupling the direction indicating mechanism to the gyroscope, whereby said direction indicating mechanism is moved by the precession of said gyroscope, and means responsive to the movement of the gyroscope about its axis with respect to the reference plane to vary the said precessional torque.

3. Sighting mechanism comprising a sighting device, variable speed mechanism including a settable speed controlling element for controlling the angular motion of said sighting device in accordance with the setting of said element, and means responsive to the angular motion of the sighting device to vary the setting of said element.

4. Sighting mechanism comprising a sighting device, a gyroscope, a driving connection between said sighting device and said gyroscope, torque applying means operably associated with said gyroscope for applying a precessing torque to said gyroscope, and means automatically operated responsively to the angular positions assumed by said gyroscope for controlling said torque applying means to vary said precessing torque.

5. Sighting mechanism comprising a sighting device, a gyroscope, a driving connection between said sighting device and said gyroscope for maintaining the line of sight of said sighting device substantially parallel with the spin axis of said gyroscope, torque applying means for applying a precessing torque to said gyroscope, and means automatically operated responsively to the angular position of said gyroscope for controlling said torque applying means to vary the magnitude of said precessing torque.

6. Sighting mechanism comprising a sighting device, a gyroscope, a driving connection between said sighting device and said gyroscope, means operably associated with said gyroscope for applying to it a precessing torque so as to control the motion of the line of sight of said sighting device and means operated responsively to the angular position of said gyroscope for controlling said precessing torque 7. Sighting mechanism comprising a sighting device, gyroscopic means for controlling the motion of said sighting device in accordance with the precession of said gyroscopic means, torque applying means for applying precessing torques to said gyroscopic means and means automatically operated responsively to the angular position of said gyroscopic means for controlling said torque applying means to vary the forces applied to precess said gyroscopic means.

8. Sighting mechanism and the like comprising a sighting device, a gyroscope connected to said sighting device so that the movements of said sighting device are controlled by the precession of said gyroscope, means actuated in accordance with the angular positions assumed by said sighting device and means operable responsively to the operation of said last named means for applying to said gyroscope a varying precessional force in accordance with the angular positions assumed by said sighting device so as to cause said gyroscope to precess at a varying angular rate, whereby the line of sight of said sighting device is maintained on an object moving with constant apparent linear velocity.

9. Sighting mechanism and the like comprising a sighting device, variable speed means for operating said sighting device so as to control the direction of motion of its line of sight, means for measuring continuously the angular position of said sighting device as it is operated by said operating means and means connected to said position measuring means so as to be operated responsively to the operation of said position measuring means for controlling said variable speed operating means in accordance with the angular positions of said sighting device to impart to said sighting device such motion that its line of sight will remain on an object having an apparent constant linear velocity.

10. Sighting mechanism comprising a sighting device, a gyroscope, means for maintaining a substantially parallel relation between the line of sight of said sighting device and the spin axis of said gyroscope, means for applying variable precession torques to said gyroscope to precess said gyroscope and move said line of sight and means operated responsively to the angular position of the line of sight and the gyroscope for determining the rate of angular motions of said gyroscope and said line of sight.

11. In combination, a gyroscope, means for applying a measured precessional force to said gyroscope, and means automatically operable responsively to the angular position of said gyroscope for controlling the application of said measured precessional force.

12. Sighting mechanism comprising a sighting device, a gyroscope, a driving connection between said gyroscope and said sighting device, means for generating a precessional force to precess said gyroscope to cause it to move said sighting device, means for transmitting the forces generated by said means to said gyroscope to precess it and power actuated means operated responsively to the angular position of said gyroscope for controlling said last named means so as to vary the effective force applied to precess said gyroscope.

13. In sighting mechanism and the like, a sighting device, a gyroscope connected to control the direction of motion of the line of sight of said sighting device, resilient means for applying to said gyroscope precessional forces, mechanism interposed between said resilient means and said gyroscope for transmitting the forces generated by said resilient means to precess said gyroscope, and means operated responsively to the angular position of said gyroscope for controlling said mechanism so as to vary the forces applied to precess said gyroscope.

14. In sighting mechanism and the like, a sighting device, a gyroscope, a driving connection between said gyroscope and said sighting device, resilient means, means interposed between said resilient means and said gyroscope for transmitting the forces generated by said resilient means to cause said gyroscope to precess and move said sighting device and means operated responsively to the angular position of said gyroscope, controlling said force transmitting means to vary the precessing torques applied to said gyroscope.

15. In sighting mechanism and the like, a sighting device, a gyroscope connected to control the direction of motion of the line of sight of said sighting device, spring means for applying measured precessional forces to said gyroscope, means interposed between said spring means and said gyroscope including lever mechanism for transmitting the forces generated by said spring means to precess said gyroscope, and means dependent upon the angular position of said gyroscope for controlling the effective leverage of said lever mechanism so as to cause said gyroscope to precess at a varying angular rate whereby said line of sight is directed on an object having a constant apparent linear velocity.

16. In sighting mechanism and the like, a sighting device, a gyroscope arranged to precess about axes, means connecting said gyroscope with said sighting device whereby the direction of motion of the line of sight of said sighting device is controlled by the precession of said gyroscope, spring members for generating substantially constant measured forces, means including lever mechanisms interposed between said spring members and axes of said gyroscope so that the measured forces generated by said spring members are applied to precess said gyroscope, and means responsive to the angular positions assumed by said gyroscope for controlling the effective leverages of said lever mechanisms so that the constant forces generated by said spring members are applied to precess said gyroscope at a varying angular rate in accordance with the motion of a target moving with a constant apparent linear velocity.

17. Sighting mechanism comprising a sighting device arranged for movement about axes, a pair of spring members arranged to generate measured forces, means interposed between said spring members and said sighting device arranged to transmit and apply said measured forces to move said sighting device about said axes, means actuated continuously in accordance with the angular position of said sighting device and means operated responsively to the operation of said last mentioned means for controlling said means for transmitting and applying said measured forces to move said sighting device so that constant settings in the forces applied by said spring members cause said device to move about said axes whereby the line of sight of said sighting device is maintained on an object moving with constant relative linear velocity.

18. In sighting mechanism and the like, a sighting device arranged for angular movement so that it can be directed on a target, a gyroscope, a driving connection between said gyroscope and said sighting device so that the motion of the line of sight of said sighting device is controlled by the precession of said gyroscope, resilient means for generating substantially constant forces, means for adjusting said resilient means so as to vary the values of the forces generated thereby, means interposed between said resilient means and said gyroscope for transmitting the forces generated by said resilient means to precess said gyroscope, and means operated responsively to the angular position of said gyroscope for controlling said force transmitting means so as to vary the force applied to precess said gyroscope to cause said gyroscope to precess at a varying angular rate, the rate being dependent upon the adjustment of said resilient means.

19. In sighting mechanism and the like, a sighting device arranged to be directed on a target, a gyroscope, a driving connection between said gyroscope and said sighting device whereby said sighting device is moved by the precession of said gyroscope, force generating means, means including lever mechanism for transmitting the forces generated by said means to precess said gyroscope and means operated responsively to the angular position of said gyroscope for varying the effective leverages of said lever mechanism.

20. Sighting mechanism and the like comprising a sighting device mounted so that it can be directed on a target and like object, a gyroscope mounted so that it can precess about a pair of axes, driving connections between said gyroscope and said sighting device so that the motion of the line of sight of said sighting device is controlled by the precession of said gyroscope, a pair of spring members for applying precessing forces to axes of said gyroscope to cause said gyroscope to precess about said first named axes, means including lever mechanisms for transmitting the forces generated by said spring members to said last named axes of said gyroscope, means actuated in accordance with the angular positions of said gyroscope about said last named axes and means for adjusting a part included in said lever mechanisms in accordance with the actuation of the last mentioned means.

21. Sighting mechanism and the like comprising a sighting device arranged to be directed on a target and like object, gyroscopic means for controlling the direction of motion of the line of sight of said sighting device, mechanism for generating a force and applying said force as a precessing torque to said gyroscopic means including means responsive to the angular position of said gyroscopic means for controlling said precessing torque so that said line of sight may be directed on a target having an apparent constant linear velocity, and means associated with said mechanism for measuring said generated force.

22. Sighting mechanism for directing a projectile on a target comprising a sighting device, a gyroscope, a driving connection between said sighting device and said gyroscope whereby the line of sight of said sighting device is maintained substantially parallel with the spin axis of said gyroscope and force applying means responsive to the position of said sighting device for applying measured precessing torques to said gyroscope so as to control the motion of the line of sight of said sighting device and means for correcting the force applied by said force applying means in accordance with the time of flight of said projectile.

HANNIBAL C. FORD.

REFERENCES CITED

The following references are of record in the file of this patent:

UNITED STATES PATENTS

| Number | Name | Date |
| --- | --- | --- |
| 2,071,424 | Papello | Feb. 23, 1937 |
| 2,105,985 | Papello | Jan. 18, 1938 |
| 2,405,047 | Newell | July 30, 1946 |
| 2,405,068 | Tear et al. | July 30, 1946 |
| 2,407,191 | Tear et al. | Sept. 3, 1946 |
| 2,408,356 | Willard | Sept. 24, 1946 |
| 2,414,108 | Knowles | Jan. 14, 1947 |
| 2,433,843 | Hammond | Jan. 6, 1948 |
| 2,437,463 | Ford | Mar. 9, 1948 |
| 2,442,389 | Weiss | June 1, 1948 |
| 2,478,839 | Ross | Aug. 9, 1949 |

FOREIGN PATENTS

| Number | Country | Date |
| --- | --- | --- |
| 616,248 | Germany | Aug. 1, 1935 |